(12) United States Patent
Takagi et al.

(10) Patent No.: US 7,175,914 B2
(45) Date of Patent: Feb. 13, 2007

(54) BASE MATERIAL HAVING THEREON POLYANILINE-CONTAINING FILM SURFACE, AND PROCESS FOR FORMING FILM SURFACE ON BASE MATERIAL

(75) Inventors: Tomomi Takagi, Nagoya (JP); Hitoshi Kuno, Nisshin (JP); Hiroaki Fukuda, Obu (JP); Yasushi Furukawa, Anjo (JP); Osamu Kasebe, Okazaki (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/282,497

(22) Filed: Oct. 29, 2002

(65) Prior Publication Data

US 2004/0202839 A1 Oct. 14, 2004

(30) Foreign Application Priority Data

Nov. 5, 2001 (JP) ............................. 2001-339461
Jun. 20, 2002 (JP) ............................. 2002-180150

(51) Int. Cl.
B32B 15/04 (2006.01)
B32B 15/08 (2006.01)
B32B 27/16 (2006.01)
F28F 21/06 (2006.01)

(52) U.S. Cl. ................. 428/411.1; 428/450; 428/457; 428/469; 428/472; 428/472.3; 165/905

(58) Field of Classification Search ............... 165/186, 165/905; 252/500; 428/411.1, 450, 457, 428/469, 472, 472.3
See application file for complete search history.

(56) References Cited

U.S. PATENT DOCUMENTS

| 3,336,099 | A | | 8/1967 | Czulak et al. |
| 4,017,953 | A | * | 4/1977 | Creighton ............... 29/890.042 |
| 4,289,196 | A | * | 9/1981 | Jabsen et al. ................ 165/83 |
| 5,070,938 | A | | 12/1991 | Mizuno et al. |
| 5,721,056 | A | | 2/1998 | Wessling .................... 428/461 |
| 5,741,887 | A | | 4/1998 | Morita et al. ............... 528/422 |
| 5,904,990 | A | | 5/1999 | Stenger-Smith et al. |
| 5,922,466 | A | | 7/1999 | Angelopoulos et al. |
| 5,976,419 | A | | 11/1999 | Hawkins et al. |
| 6,344,132 | B1 | | 2/2002 | Hirayama et al. |
| 2002/0062951 | A1 | | 5/2002 | Kuno et al. |

FOREIGN PATENT DOCUMENTS

| EP | 0 676 250 A1 | | 10/1995 |
| EP | 0 782 970 A1 | | 7/1997 |
| JP | 5-170904 | * | 7/1993 |
| JP | 8-296992 | | 11/1996 |
| JP | 10-316403 | | 12/1998 |
| JP | 11-277065 | | 10/1999 |
| JP | 2000-24512 | | 1/2000 |
| JP | 2000-210666 | | 8/2000 |
| JP | 2001-070426 | | 3/2001 |
| JP | 2002-66249 | | 3/2002 |

OTHER PUBLICATIONS

Derwent abstract for JP 5-170904, Jul. 1993.*
English translation of JP 05-170904, Jul. 1993.*
Handbook of Coatings Additives, Chap 10: Adition Promoters, pp. 281-294, 1987.*

* cited by examiner

*Primary Examiner*—Ramsey Zacharia
(74) *Attorney, Agent, or Firm*—Harness, Dickey & Pierce, PLC (57) ABSTRACT

In a heat exchanger having tubes and fins, a polyaniline film made of polyaniline and/or a derivative thereof is formed on the surfaces of the tubes and the fins. This polyaniline film is imparted with at least one hydrophilic functional group selected from the class consisting of a primary amino group, a secondary amino group, a tertiary amino group, an ammonium group, a nitric acid group, a carboxyl group, a sulfonic acid group, a phosphonic acid group and a hydroxyl group. Accordingly, the surfaces of the tubes and the fins has good water wettability while maintaining deodorizing and sterilizing functions.

20 Claims, 9 Drawing Sheets

● : HEAT TREATMENT TEMP. 140°C
■ : HEAT TREATMENT TEMP. 200°C
▲ : REFERENCE EXAMPLE

FIG. 13

● : HEAT TREATMENT TEMP. 140°C
■ : HEAT TREATMENT TEMP. 200°C
▲ : ONLY POLYANILINE

BASE MATERIAL HAVING THEREON POLYANILINE-CONTAINING FILM SURFACE, AND PROCESS FOR FORMING FILM SURFACE ON BASE MATERIAL

CROSS REFERENCE TO RELATED APPLICATION

This application is based on Japanese Patent Applications No. 2001-339461 filed on Nov. 5, 2001, and No. 2002-180150 filed on Jun. 20, 2002, the disclosure of which is incorporated herein by reference.

FIELD OF THE INVENTION

The present invention relates to a base material with a polyaniline-containing film on the surface of the base material, and a process for forming the film on the surface of this base material. The base material can be used for a heat conducting surface of a heat exchanger equipped with tubes, fins and the like, and the heat exchanger can be used for a vehicle air conditioner or an air conditioner having a degrading and deodorizing function of an odor material or a sterilizing function of harmful microorganisms.

BACKGROUND OF THE INVENTION

Generally, a film material, for preventing adhesion of a substance which will be causative of odor or pollution, is applied on a surface of a heat exchanger. A substance having a functional group and having high polarity tends to adhere to a metal base member which has a complex surface shape such as tubes or fins of a heat exchanger, and once it adheres thereto, further adhesion cannot be prevented easily. It is therefore necessary for the base material to have a function to degrade such the substance as soon as it adheres thereto. For example, in JP-A-8-296992 or JP-A-12-24512, a heat exchanger is imparted with deodorizing and sterilizing functions. That is, a photocatalyst (a film of titanium dioxide) is applied to an aluminum fin surface of the heat exchanger.

Although not particularly limited to a heat exchanger, there is an attempt to prevent odor generation by adding a silver salt, as a sterilizer, to a film component (polymer film), thereby sterilizing microorganisms attached thereto.

The heat exchanger proposed in the above patent gazettes however needs installment of a lamp for a photocatalyst (lamp for irradiating UV), which causes problems such as cost increase and durability of a lamp, particularly durability against vibration when it used in a vehicle air conditioner. Moreover, dusts from a blower fan adhere to a lamp, so an irradiation intensity may be lowered.

In the heat exchanger proposed in the above-described patent gazettes, since a film is formed on an aluminum surface with titanium dioxide as a photocatalyst, peeling occurs easily and durability is low. Accordingly, it difficult to maintain fundamental performances or productivity of the heat exchanger. In particular, when an inorganic substance such as titanium dioxide scatters by an air flow of a temperature controller, a dust odor may be caused.

Thus, a polymer film may be used instead of a titanium dioxide film, and addition of a sterilizer (the above-described silver salt, etc.) to the polymer film may be considered as a countermeasure against the above-described problem. However, in this case, elution of the sterilizer occurs, leading to problems in capacity and durability.

On the other hand, JP-A-9-175801 proposes a polyaniline film having an active oxygen generating function, and capable of carrying out deodorization and sterilization due to active oxygen. The polyaniline film has a high capacity of generating a superoxide capable of degrading a variety of odor materials compared with ordinarily employed sterilizers.

The film surface of a heat exchanger needs to have hydrophilic, but a polyaniline film is essentially hydrophobic. Accordingly, when a polyaniline film is directly used, wettability of water droplets adhering to the film is deteriorated. Therefore, water droplets scatter by the air flow, and it is difficult to maintain the fundamental performances of the heat exchanger. For example, scattering of water droplets leads to inconveniences such as supply of air mixed with water vapor to a user.

SUMMARY OF THE INVENTION

In view of the foregoing problems, it is an object of the present invention to provide a base material having thereon a polyaniline film having good water wettability while maintaining deodorizing/sterilizing functions.

It is another object of the present invention to provide a process for forming the polyaniline film on the surface of the base material.

According to a first aspect of the present invention, a base material member includes a base material and a film on the surface of the base material. The film is a polyaniline film made of polyaniline and/or a derivative thereof, and the polyaniline film is imparted with at least one hydrophilic functional group selected from a primary amino group, a secondary amino group, a tertiary amino group, an ammonium group, a nitric acid group, a carboxyl group, a sulfonic acid group, a phosphonic acid group and a hydroxyl group. Accordingly, the water wettability of the polyaniline film on the base material can be improved by the hydrophilic functional group imparted to the polyaniline film. Therefore, the base material member having the polyaniline film on the surface of the base material has good water wettability while maintaining deodorizing/sterilizing functions.

Alternatively, in the present invention, the polyaniline film on the surface of the base material contains a binder imparted with at least one hydrophilic functional group selected from the class consisting of a primary amino group, a secondary amino group, a tertiary amino group, an ammonium group, a nitric acid group, a carboxyl group, a sulfonic acid group, a phosphonic acid group and a hydroxyl group. Here, the hydrophilic functional group to be imparted to the polyaniline film can be imparted as one component of the binder existing in the polyaniline film. Alternatively, the binder itself can be a compound having the hydrophilic functional group. Alternatively, a compound having the hydrophilic functional group may be mixed in the binder compound. Accordingly, the above-described advantage can be obtained.

Preferably, the polyaniline film contains an insolubilizing agent for insolubilizing the polyaniline film. As the insolubilizing agent, a carbodiimide-containing one can be adopted. When the polyaniline film is imparted with a hydrophilic functional group, it may happen to be soluble in water. Accordingly, the insolubilizing agent is added to insolubilize the polyaniline film.

The base material member can be used as a heat conducting surface of a heat exchanger. In this case, preferably, the polyaniline film has a contact angle of 60° or less. In the present invention, by adjusting the contact angle of the polyaniline film at 60° C. or less, the polyaniline film has good water wettability while maintaining deodorizing/sterilizing functions. More preferably, the polyaniline film has a contact angle of 40° or less.

Preferably, the polyaniline and/or a derivative thereof has a dopant. Accordingly, the polyaniline or polyaniline derivative constituting the polyaniline film can be made a doped type with anions, and therefore, hydrophilicity and active oxygen generating capacity can be further improved.

Preferably, an interlevel film is provided between the surface of the base material and the polyaniline film. As the interlevel film, a film formed by subjecting the surface of the base material to at least one treatment selected from zinc phosphate treatment, titanium phosphate treatment, chromate treatment, molybdic acid treatment, selenium chloride treatment and silane compound treatment can be used. The interlevel film formed by the above-described treatment can increase the surface roughness of the base material, thereby improving adhesion of the polyaniline film formed thereon.

According to a second aspect of the present invention, a process for forming a film on the surface of a base material, includes a step for polymerizing aniline added with at least one hydrophilic functional group to prepare polyaniline, and forming the film on the surface of the base material using the polyaniline. Accordingly, it is possible to form the film made of polyaniline and/or a derivative thereof imparted with the hydrophilic functional group, thereby improving water wettability of the formed film. As a result, the film formed through the process on the surface of the base material has good water wettability while maintaining deodorizing/sterilizing functions.

Preferably, after formation of the film on the surface of the base material by using polyaniline, the film is heat treated. Heat treatment of the formed polyaniline film is presumed to accelerate the crosslinking of polyaniline of the film, and it is possible for the film to improve both toughness and durability.

Specifically, after forming the polyaniline film on the surface of the base material, hardening or insolubilizing the polyaniline film is performed. In this manufacturing process, the polyaniline film may be formed by polymerizing aniline added with a hydrophilic functional group, or the polyaniline film not imparted with a hydrophilic functional group may be added with the hydrophilic functional group. Anyway, by hardening or insolubilizing the polyaniline film after formation of the polyaniline film imparted with a hydrophilic functional group, the toughness and the durability of the film can be effectively improved.

Alternatively, a mixed solution of an additive added with at least one hydrophilic functional group and polyaniline can be applied to the surface of the base material. Even in this case, the water wettability of the polyaniline film can be improved. Alternatively, the process includes a step of forming a polyaniline film on the surface of a base material by using polyaniline, and a step of hydrophilizing the polyaniline film. Further, the hydrophilization of the polyaniline film can be performed by at least one method selected from ozone exposure, plasma exposure, heat treatment, ultraviolet exposure and solution immersion. Alternatively, the hydrophilization of the polyaniline film in the film forming process can be performed by immersing the base material having the polyaniline film in an aqueous protonic acid solution. In this case, the base material is washed with water after immersion in the aqueous protonic acid solution. Since a protonic acid (nitric acid, sulfuric acid, hydrochloric acid, or the like) is a strong acid, its residue after hydrophilization is apt to corrode the base material. Removal of the protonic acid by washing with water can therefore prevent the corrosion of the base material.

Preferably, an antioxidant film is formed on the surface of the base material before the formation of the polyaniline film. Generally, even if pin holes exist in the polyaniline film, it is difficult to be controlled because the surface of the base material is not exposed. In the present invention, even in this case, by the antioxidant film on the surface of the base material, corrosion due to the hydrophilization can be prevented.

The antioxidant film is formed by subjecting the surface of the base material to at least one treatment selected from zinc phosphate treatment, titanium phosphate treatment, chromate treatment, molybdic acid treatment, selenium chloride treatment and silane compound treatment. Accordingly, the adhesion of the polyaniline film on the surface of the base material can be improved.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENT

Figure 1:
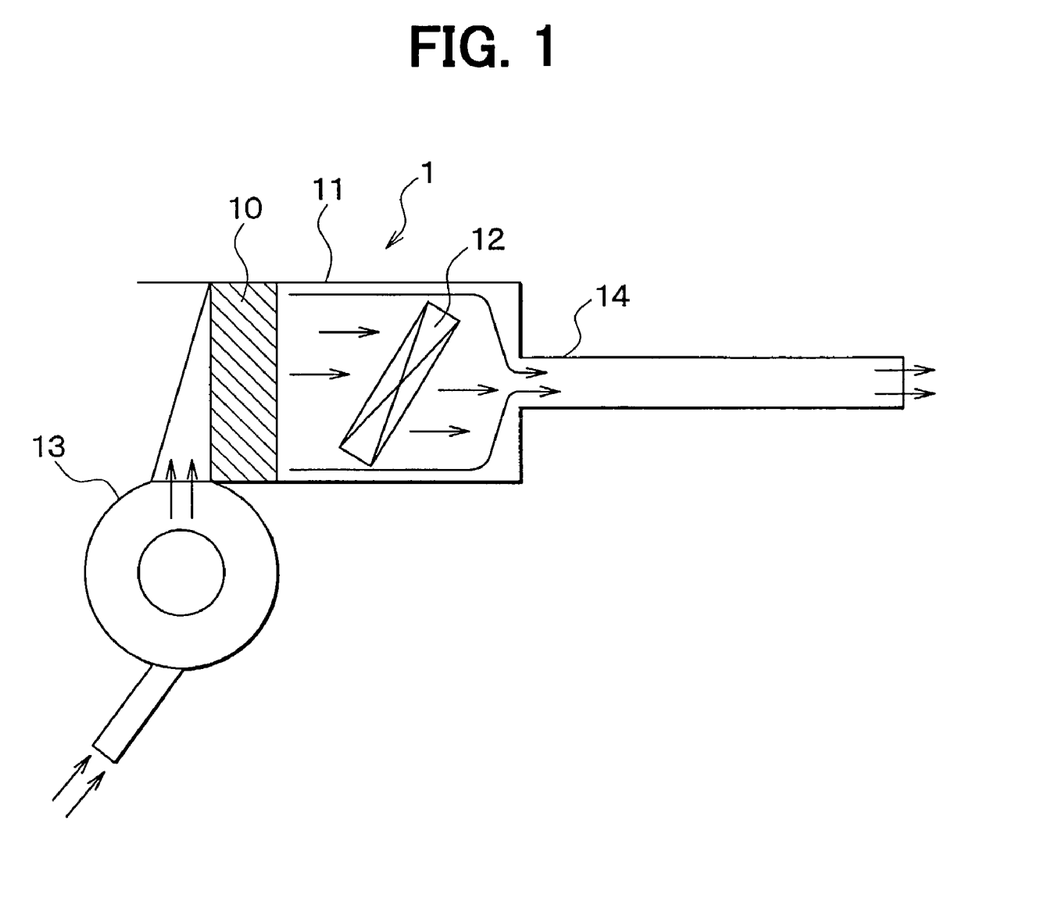
FIG. 1 is a schematic diagram showing a constitution of a temperature controller according to a preferred embodiment of the present invention.

An embodiment of present invention will hereinafter be described with accompanying drawings. FIG. 1 is a temperature controller 1 having a heat exchanger 10 relating to the embodiment of the present invention. This temperature controller 1 is used as a vehicle air conditioner or the like.

The temperature controller 1 has a case 11, a heat exchanger 10 disposed therein, a heater 12 for heating air, an air intake apparatus 13 and an air outlet opening 14. The heat exchanger 10 includes tubes and fins obtained by molding using an aluminum material, for example. The tubes and the fins are brazed to form the heat exchanger. For example, the heat exchanger 10 is a corrugated-fin type heat exchanger. This heat exchanger 10 is used as an evaporator having tubes inside of which a heat exchange fluid such as fluorocarbon (flon) is circulated.

Air introduced into the case 11 from the air intake apparatus 13 is cooled in the heat exchanger 10 and is heated in the heater 12. Warm air from the heater 12 and cool air from the heat exchanger 10 are suitably mixed, and the mixed air is blown out from the air outlet opening 14 to a passenger compartment, for example.

In the heat exchanger 10, the tubes and the fins are heat conducting surfaces each of which is used as a base material member of the present invention. On the heat conducting surfaces, a polyaniline film made of polyaniline, a polyaniline derivative or a mixture of polyaniline and a polyaniline derivative is formed. This polyaniline is imparted with a hydrophilic functional group. If the heat exchanger 10 has a heat conducting surface other than the tubes and the fins, the above-described polyaniline film may be formed thereon.

The hydrophilic functional group is at least one group selected from the class consisting of primary amino group, secondary amino group, tertiary amino group, ammonium group, nitric acid group, carboxyl group, sulfonic acid group, phosphonic acid group and hydroxyl group (which will hereinafter be called "the class of hydrophilic functional groups").

The hydrophilic functional group can be chemically bonded to polyaniline or a polyaniline derivative constituting a polyaniline film, or can exist in the film as a substance contained in a binder to be mixed in the polyaniline film. The binder exists in polyaniline or derivative thereof in the polyaniline film. This binder itself can be a compound having a hydrophilic functional group, or a compound having a hydrophilic functional group can be mixed in the binder.

For example, polyacrylamide having the above-described amino group is usable as a binder. Examples of the compound having a hydrophilic functional group include nitric acid, sulfuric acid, hydrochloric acid, carboxylic acid and p-styrenesulfonic acid.

Although no limitation is imposed, doped-type compounds represented by the formula 1 and a non-doped type compound represented by the formula 2 can be used as polyaniline or polyaniline derivative.

[Formula 1]

[Formula 2]

In the above-described chemical formulas 1 and 2, A represents an anion, n indicates an integer within a range of 2 to 5000, and x and y are numerals which simultaneously satisfy $x+y=1$ and $0 \leq y \leq 0.5$.

The doped type polyaniline or polyaniline derivative has a dopant (anion A in the above-described formula 1) attached thereto by electrostatic mutual action. It is usually superior to a non-doped type compound in active oxygen generating capacity and hydrophilic property.

In the heat exchanger 10 having such a polyaniline film formed as a surface film, air containing water vapor passes through the heat exchanger 10 when the temperature controller 1 is operated. When air contacts the heat exchanger 10, the dew point of the air is lowered, so that the water vapor in the air becomes water droplets and attach to the surface of the tubes or the fins (surface of the polyaniline film) of the heat exchanger 10 as condensed water.

When the condensed water contacts the polyaniline film, polyaniline reduces dissolved oxygen in the condensed water into superoxide anion radical which is active oxygen. The obtained active oxygen degrades odor materials or substances such as microorganisms and bacteria in the condensed water. As a result, the air passing through the heat exchanger 10 is deodorized and sterilized, whereby clean air is supplied to the passenger compartment.

According to this Embodiment, by hydrophilizing the polyaniline film by the addition thereto of a hydrophilic functional group, the polyaniline film has improved water wettability. This suppresses generation of scattering of water droplets due to air passing through the heat exchanger 10. In this manner, the heat exchanger 10 has, as a surface film, the polyaniline film having good water wettability while maintaining deodorizing/sterilizing functions.

Next, a process for forming the polyaniline film of the heat exchanger 10 according to this embodiment will be described. Aniline having a hydrophilic functional group selected from the above-described class of hydrophilic functional groups is prepared and is polymerized to obtain polyaniline having the hydrophilic functional group. The resulting polyaniline is dissolved in a solvent. The solution is applied to the tubes and the fins of the heat exchanger 10 which have been brazed, and is dried (first film forming process).

By the above-described process, the polyaniline film as the surface film of this embodiment is formed. The polyaniline film can be made from polyaniline and/or a derivative thereof imparted with a hydrophilic functional group. Therefore, the polyaniline film has good water wettability while maintaining deodorizing/sterilizing functions.

In the above-described first film forming process, it is preferred to heat treating the polyaniline film (for example, to 20° C. or greater) after forming it on the surface of a tube and a fin (metal base materials). By this heat treatment, the polyaniline film is hardened and insolubilized. Compared with a case where the heating treatment is not performed, the polyaniline film improved both in toughness and durability can be provided.

The polyaniline film of this embodiment can be formed by applying, to the surfaces of the tube and the fin, a mixed solution of polyaniline and an additive imparted with a hydrophilic functional group selected from the above-described class of hydrophilic functional groups, and by drying (second film forming process). In this case, of course, the formed polyaniline film may be hardened and insolubilized by heating treatment or the like.

Examples of the additive usable here include binders such as polyacrylamide having the above-described amino group, compounds having a hydrophilic functional group (p-styrenesulfonic acid and the like), and binders in which a compound having a hydrophilic functional group is mixed.

A mixed solution of the additive and polyaniline is applied to the surface of a metal base material, so that the hydrophilic functional group is readily added to the polyaniline film. Accordingly, the formed polyaniline film has good water wettability while maintaining deodorizing/sterilizing functions.

In the above-described first and second film forming processes, formation of the polyaniline film, and addition thereto of a hydrophilic functional group, that is hydrophilization of the polyaniline film, are performed at the same time. However, the polyaniline film can be hydrophilized after formation of the polyaniline film on the surface of the metal base material by using polyaniline (third film forming process).

For the hydrophilization of the polyaniline film, at least one method selected from ozone exposure, plasma exposure, heat treatment, UV exposure and solution immersion can be adopted. The polyaniline film can be hydrophilized by immersing the tube or the fin having the polyaniline film formed thereon in an aqueous solution of a protonic acid.

This third film forming process can also add hydrophilic property to the polyaniline film, so that a polyaniline film having good water wettability while maintaining deodorizing/sterilizing functions can be formed.

When hydrophilization is conducted by the above-described immersion in an aqueous protonic acid solution, it is preferred to wash the tube and the fin with water after immersion in the aqueous protonic acid solution. Moreover, drying after the washing with water is preferably conducted using hot air of 100° C. or less.

In the above-described third film forming process, before hydrophilization of the polyaniline film, the film is preferably dried at 100° C. or greater in a drying furnace to sufficiently dry it.

Moreover, before hydrophilization of the polyaniline film, it is preferred to remove the polyaniline film having pin holes therein based on the evaluation results, through microscopic observation, of the covering condition of the surfaces of the tube and the fin with the polyaniline film and judging whether the polyaniline film covers all of the surfaces or not. If the polyaniline films have pin holes therein and the underlying aluminum surface is exposed from them, there is a risk of inconveniences such as corrosion of aluminum by the subsequent hydrophilizing treatment.

When there is a difficulty in controlling the above-described pin holes, it is preferred to form an antioxidant film such as chromate (chromium plating) on the surfaces of the tube and the fin before the formation of the polyaniline film and then to form the polyaniline film over the antioxidant film.

In this embodiment, the polyaniline film preferably contains an insolubilizing agent for insolubilizing the polyaniline film. As such an insolubilizing agent, a compound containing a carbodiimide group can be adopted. The general chemical structure of a carbodiimide-containing compound is represented by the following formula 3:

[Formula 1]

In the chemical formula 3, R1 and R2 each represents a hydrocarbon group.

In some cases, the polyaniline film imparted with a hydrophilic functional group becomes easily soluble in water. In this case, when an insolubilizing agent is contained in the polyaniline film, an insolubilized polyaniline film can be obtained.

The insolubilization of the polyaniline film by the addition of the above-described insolubilizing agent containing a carbodiimide group is presumed to occur because a double bond in the carbodiimide group reacts with the terminal of polyaniline and causes crosslinking of polyaniline, leading to an increase in its molecular weight.

In this embodiment, an interlevel film can exist between the surface of a base material such as tubes or fins, and the polyaniline film. As such an interlevel film, a film formed by subjecting the surface of a base material, that is an aluminum surface in this embodiment, to at least one treatment selected from zinc phosphate treatment, titanium phosphate treatment, chromate treatment, molybdic acid treatment, selenium chloride treatment and silane compound treatment.

Because the interlevel film formed by the above-described treatment increases its surface roughness, adhesion of the polyaniline film formed on the interlevel film can be improved.

The present invention will hereinafter be described more specifically with reference to Examples which will be described below. It should however be borne in mind that the present invention is not limited to or by them.

EXAMPLES

Example 1

In Example 1, a specific example of the above-described third film forming process (the polyaniline film is made hydrophilic after film formation) will be described. First, an aluminum material is molded or formed into components of the heat exchanger 10, such as the tube or the fin. The components are brazed at a temperature of 600° C. or greater, so that a brazed member of the heat exchanger 10 is obtained.

The brazed member is then cleaned. In the cleaning, alkali cleaning of the surface of the brazed member is performed. An alkali solution used for cleaning is a 4% diluted solution obtained by diluting, with water, a solution containing 15 wt. % of $Na_2SiO_3$, 59 wt. % of a nonionic surfactant and 1 wt. % of a cationic surfactant. The brazed member is then washed with running water. Thereafter, water is drained off, and the member is dried.

Then, the polyaniline film is formed. As a solvent for film formation, 1-methyl-2-pyrrolidone (which will hereinafter be abbreviated as "NMP") is used. In the solvent, polyaniline is dissolved at room temperature in an amount as much as possible. After the above-described brazed member is immersed in the solution, the member is drained and then, dried.

Drying is carried out in a drying furnace at 140° C. for 15 minutes. Insufficient drying of the polyaniline film may cause film peeling in the subsequent hydrophilizing step, leading to corrosion of the tube and the fin by nitric acid. In this example, the film is dried sufficiently under the above-described drying conditions.

Then, the polyaniline film on the surfaces of the brazed members (tube and fin) is determined whether it has film-free portions (pin holes) or not. Pin holes are found easily in a short time by observing predetermined points by an optical microscope, inputting the image as an electronic data, digitalizing the data (white: aluminum and pin holes, black: polyaniline) by an image processing software and then detecting the white portions.

The polyaniline film having pin holes is removed, and the polyaniline film without pin holes is made hydrophilic. The brazed member (heat exchanger) having thereon the polyaniline film is immersed in a 10% aqueous solution of nitric acid for 1 minute, is washed with pure water for several seconds and then is dried with nitrogen blowing. The immersion time in an aqueous nitric acid solution is controlled within one minute, in consideration of the influence of it to the aluminum base materials (tube and fin). The immersion time is preferably adjusted depending on the thickness of the polyaniline film. A thick film is immersed for a longer time, while immersion time of a thin film is set shorter.

The washing with pure water is performed in order to prevent corrosion of the polyaniline film and aluminum base member of the heat exchanger (brazed member) which will otherwise occur because of the concentration of the acid adhered by immersion and remaining on the surface after drying.

After immersion, the brazed material may be dried at high temperature instead of drying with nitrogen blowing. Drying at lower temperature for shorter time is however recommended to prevent disappearance of nitric acid ion dopant by heat. Immersion in an aqueous nitric acid solution intends to make polyaniline hydrophilic and to improve active oxygen generating capacity of polyaniline by doping thereinto nitric acid ions.

An aqueous solution for immersion is not limited to an aqueous solution of nitric acid, but sulfuric acid, hydrochloric acid or chromic acid can be used. In particular, sulfuric acid is a preferable dopant, because evaporation of it by heat can be avoided. These protonic acids are however strong acids and their residue after hydrophilizing treatment tends to corrode an aluminum base material so that sufficient care must be taken in handling. In Example 1, corrosion is prevented by removal of a protonic acid by washing with water.

The brazed member of Example 1 obtained by such hydrophilizing treatment (immersion in an aqueous nitric acid solution, washing with water and drying) is studied. As a result, a color change of polyaniline (from violet to yellowish green) is observed. It is presumed to be caused by doping of a nitric acid group. In doping with hydrochloric acid or sulfuric acid ion, a similar color change of polyaniline is confirmed, suggesting that the polyaniline became doped type.

Figure 2:
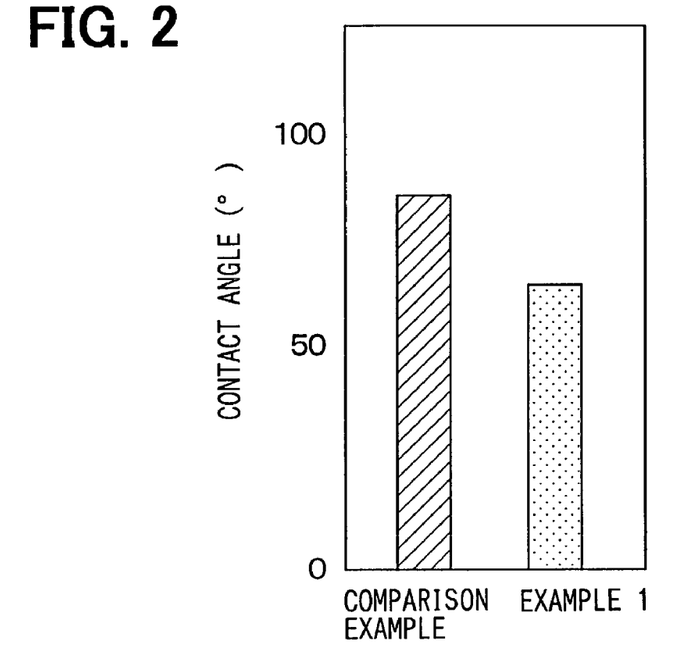
FIG. 2 is a graph for explaining a decrease of a contact angle of a film surface in Example 1 of the present invention.

As illustrated in FIG. 2, the contact angle with water on a film surface of the polyaniline film is lowered. FIG. 2 illustrates contact angles of the polyaniline film without hydrophilizing treatment (Comparison Example) and the hydrophilized polyaniline film of Example 1 (immersed for 1 minute in 10% nitric acid), as measured by a contact angle meter (product of Kyowa Interface Science). The contact angle with water on the film surface in Example 1 decreases from 80° of comparison example, to 55–60°. It shows an improvement of water wettability by about 20° of the contact angle.

The brazed material of Example 1 can be used as the heat exchanger 10 of the temperature controller 1 for a vehicle air conditioner as illustrated in FIG. 1. In this case, scattering of water droplets can be suppressed greatly compared with the heat exchanger without the hydrophilization (comparison example).

The temperature controller 1 equipped with the heat exchanger of Example 1 is capable of cleaning, degrading, deodorizing and sterilizing organic substances causative of contamination, odor and harmful microorganisms of the surrounding circumstances without scattering water generated upon operation, while carrying out smooth temperature control. Therefore, the temperature controller 1 can maintain a clean state of the surrounding circumstances.

Example 2

Similar to Example 1, this example 2 is a specific example where the above-described third film forming process is applied. In Example 2, only the kind of an acid solution used in the hydrophilizing step is different from that employed in Example 1. Steps of washing of the brazed member, formation of the polyaniline film and detection of pin holes are conducted in a similar manner to Example 1.

The brazed member (heat exchanger) having the polyaniline film formed thereon is immersed in a 10% aqueous solution of p-styrenesulfonic acid for performing the hydrophilizing treatment (addition of a sulfonic acid group).

Figure 3:
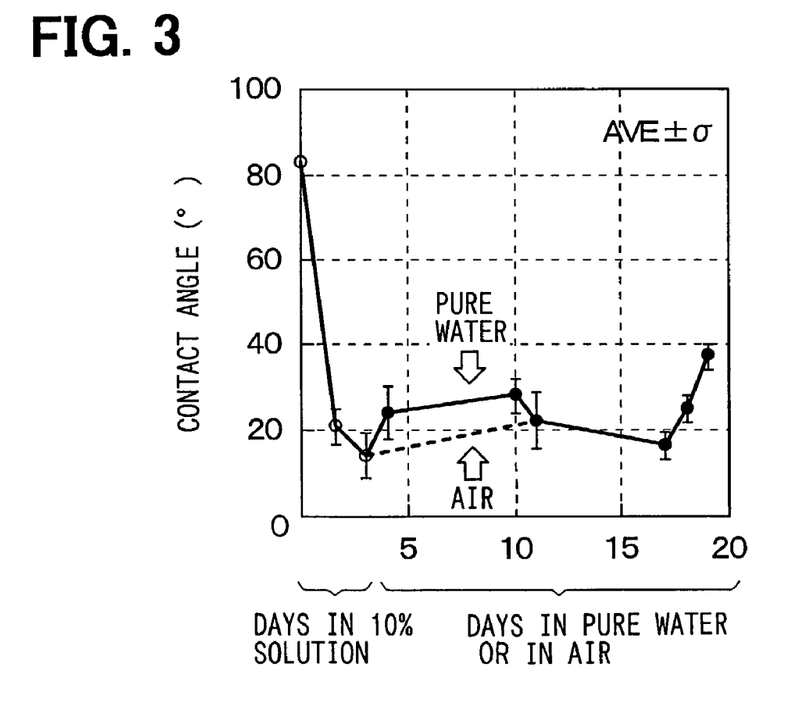
FIG. 3 is a graph for explaining a decrease of the contact angle of a film surface in Example 2 of the present invention.

FIG. 3 shows a change in the contact angle with water on a film surface after immersion of the brazed member in a 10% aqueous solution of p-styrenesulfonic acid for 2 or 3 days. In FIG. 3, white circle plots show the term (days) of immersion in a 10% solution). The contact angle is dropped drastically from 80° before immersion to 20° or less. Thus, water wettability can be improved.

Also, FIG. 3 shows investigation results of a change in the contact angle when the brazed member is, after immersion in a 10% aqueous solution of p-styrenesulfonic acid for 3 days for hydrophilization, immersed in pure water (black circle plots along a solid line graph in FIG. 3) or is placed in the air (black circle plots along a broken line graph in FIG. 3). The contact angle can be maintained at 40° or less even if the brazed material is immersed in water for a long period of time. Therefore, good water wettability of the film surface can be maintained for a long period of time.

The brazed material of Example 2 is employed as a heat exchanger for a vehicle air conditioner as in Example 1. In this case, no scattering of water droplets is confirmed. A temperature controller equipped with the heat exchanger of Example 2 is capable of cleaning, degrading, deodorizing and sterilizing organic substances causative of contamination, odor and harmful microorganisms of the surrounding circumstances without scattering water generated upon operation, while carrying out smooth temperature control. Therefore, the same advantage described in Example 1 can be obtained.

Here, hydrophilization of the polyaniline film is performed by using p-styrenesulfonic acid. As a modification example of Example 2, p-styrenesulfonic acid is used as an additive. In this case, the above-described second preparation process (use of a mixed solution of an additive imparted with a hydrophilic functional group and polyaniline) can be used.

Specifically, a polyaniline film similarly improved in water wettability can be formed by adding polyaniline to a solution of p-styrenesulfonic acid in NMP, immersing the brazed member in the resulting solution, draining the solution and then, drying the member.

Drying is conducted at 40° C. to 80° C. in order to prevent cracks which will otherwise occur at higher temperatures. Drying time varies, depending on the drying temperature. Too short drying time tends to cause film peeling in the subsequent steps so it is necessary to confirm the drying state sufficiently.

Example 3

Example 3 shows is a specific example to which the above-described third film forming process is applied as in Example 1. Instead of hydrophilization by immersion in a solution, ozone exposure is employed for hydrophilization. Steps of washing of a brazed member, formation of a polyaniline film and detection of pin holes are conducted in a similar manner to Example 1.

The brazed member (heat exchanger) having the polyaniline film formed thereon is placed in an individual cabin connected to an ozonizer (product of ASAHI TECHNI-GLASS) from which ozone is fed for 1 to 5 hours at 100 mg/h. In five minutes after the ozone feeding is started, the ozone concentration in a beaker became about 150 ppm and constant (measured by "GASTEC Detection Tube" (18M, 18L) (trade name).

Figure 4:
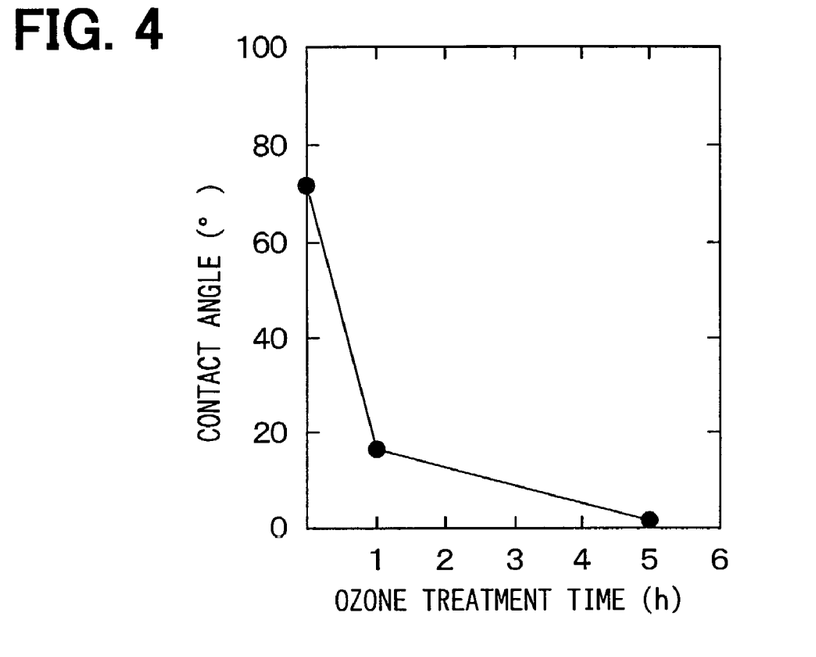
FIG. 4 is a graph showing a relationship between an ozone treatment time and a contact angle of a film surface in Example 3 of the present invention.

With regards to a portion of the heat exchanger subjected to hydrophilization by such ozone exposure, contact angle is measured. The results are shown in FIG. 4. The contact angle of the polyaniline film on the surface of the heat exchanger subjected to ozone treatment is lowered with the ozone treating time. Just after 5 hours treatment, the contact angle becomes in a range of 2° to 3° at which water droplets are spread all over the film.

The surface bonding state of the polyaniline film subjected to ozone exposure is analyzed by XPS (X-ray Photoelectron Spectroscopy) and FT-IR (Fourier Transform-Infrared Spectroscopy). As a result, existence of oxygen-containing groups such as C=O, N—O and OH (hydrophilic functional groups) is confirmed. These functional groups contribute to actualize improvement of water wettability of the polyaniline film (lowering of contact angle) and to prevent water droplet scattering in a heat exchanger for a vehicle air conditioner.

A portion of the heat exchanger of Example 3 having a hydrophilized polyaniline film is cut into a piece of 5 mm square. This piece is immersed in 0.5 ml of water for 5 hours. As a result of measuring the concentration of hydrogen peroxide in the resulting solution, generation of a superoxide (active oxygen) is confirmed.

As in Example 1, the brazed member of Example 3 is used for a heat exchanger for a vehicle air conditioner. In this case, no scattering of water droplets is confirmed. A temperature controller equipped with the heat exchanger of Example 3 is capable of cleaning, degrading, deodorizing and sterilizing organic substances causative of contamination, odor and harmful microorganisms of the surrounding circumstances without scattering water generated upon operation, while carrying out smooth temperature control. Therefore, the same advantage described in Example 1 can be obtained.

Example 4

Specific example of the above-described first film forming process (formation of the polyaniline film by polymerizing aniline having a hydrophilic functional group) is shown in Example 4. Steps until washing of the brazed member are conducted in a similar manner to Example 1.

Aniline (aniline sulfonic acid, 20 g) having a sulfonic acid group or a hydroxyl group bonded thereto and 300 ml of 1M hydrochloric acid are mixed and they are stirred over an ice-salt bath. Separately, ammonium persulfate is added to 1M hydrochloric acid at a rate of 12 g/50 ml to be dissolved, and is sufficiently cooled over an ice-salt bath.

The prepared two solutions are mixed and stirred for about 2 hours while stirring, whereby a precipitate (polyaniline obtained by polymerization) is obtained. The precipitate is dissolved in NMP at room temperature as much as possible. The brazed member is immersed in the resulting solution, is drained and is dried. In this manner, the brazed member (heat exchanger) having, formed thereon, the polyaniline film imparted with a hydrophilic functional group can be prepared.

Figure 5:
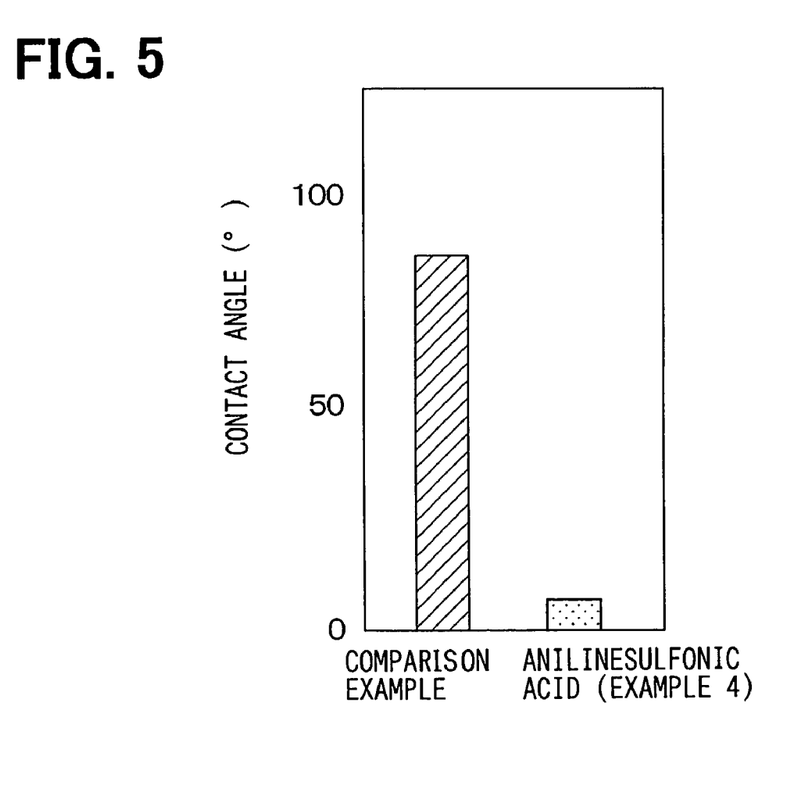
FIG. 5 is a graph for explaining a decrease of the contact angle of a film surface in Example 4 of the present invention.

The contact angle of a portion of the heat exchanger is measured. The results are shown in FIG. 5. The contact angle of the polyaniline film (anilinesulfonic acid) on the surface of the heat exchanger of Example 4 is lowered to 20° or less, as compared with the contact angle 80° of the polyaniline film of Comparison Example. At such a small contact angle, water droplets spread all over the film.

As in Example 3, a portion of the heat exchanger of Example 4 having the polyaniline film is cut into a piece of 5 mm square. This piece is immersed in 0.5 ml of water for 5 hours. As a result of measuring the concentration of hydrogen peroxide in the resulting solution, generation of a superoxide is confirmed.

As in Example 1, the brazed member of Example 4 is used in a heat exchanger for a vehicle air conditioner. As a result, no scattering of water droplets is confirmed. A temperature controller equipped with the heat exchanger of Example 4 is capable of cleaning, degrading, deodorizing and sterilizing organic substances causative of contamination, odor and harmful microorganisms of the surrounding circumstances without scattering water generated upon operation, while carrying out smooth temperature control. Therefore, the same advantage described in Example 1 can be obtained.

Example 5

Example 5 is a specific example to which the above-described first film forming process is applied as in Example 4. In Example 5, after formation of the polyaniline film, it is heat treated in order to obtain a film improved in toughness and durability.

Steps until washing of the brazed member are performed in a similar manner to Example 1. In pure water, water dispersible polyaniline ("ORMECON P9004W", trade name) prepared by polymerizing aniline having a hydrophilic functional group such as sulfonic acid group or hydroxyl group is dissolved as much as possible at room temperature.

The brazed member is immersed in the resulting solution, is drained and then dried, so that the brazed member (heat exchanger) having, formed thereon, a polyaniline film imparted with a hydrophilic functional group is prepared. The prepared heat exchanger is then heat treated by placing it in each of the furnaces at 140° C., 200° C., 250° C. and 300° C. Further, the time for performing the heat treatment is set at 15 minutes and 60 minutes.

Figure 6:
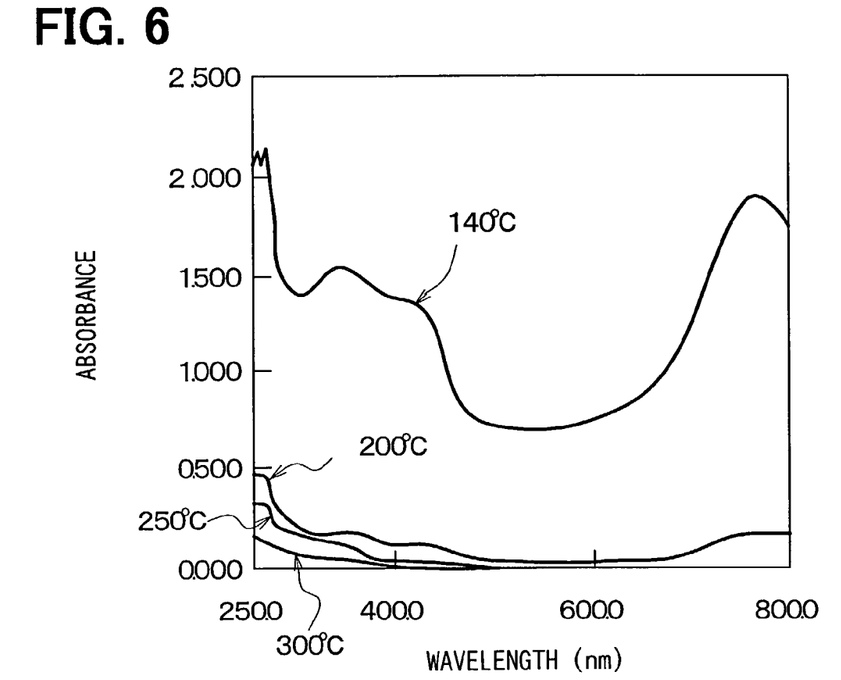
FIG. 6 is an absorbance spectrum graph showing an absorbance change of a polyaniline film at different heat treatment temperatures in Example 5 of the present invention.

A portion of the heat exchanger after being heat treated at each temperature is cut into a piece of 5 mm×10 mm. The piece is immersed in 0.5 ml of pure water for 24 hours and then, absorbance of the pure water is measured. The comparison results of the absorbance at different temperatures are shown in FIG. 6. It has been found that the higher the treating temperature, the lower the peak of absorbance and less elution of polyaniline.

Figure 7:
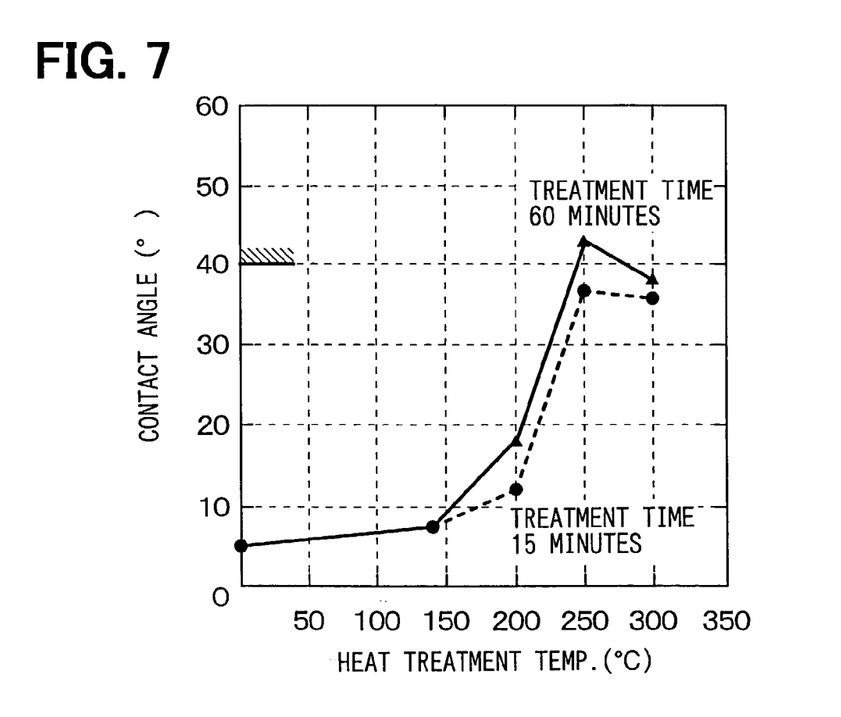
FIG. 7 is a graph showing the relationship between the heat treatment temperature and the contact angle of a film surface in Example 5 of the present invention.

FIG. 7 shows the relationship between the heat treatment temperature and contact angle, at different heat treatment time of 15 minutes and 60 minutes. Here, the heat treatment time of 15 minutes is indicated by the black circle points, and the heat treatment time of 60 minutes is indicated by the black triangle points. As shown in FIG. 7, the contact angle is increased between the treating temperatures of 200° C. and 250° C. However, compared with the hydrophobic polyaniline film (comparison example of FIG. 2), the contact angle is lowered markedly (from 80° to about 40°).

In Example 5, the aniline having the hydrophilic functional group is polymerized to form a polyaniline film, and then the polyaniline film is heat treated. Accordingly, it is possible to obtain a film having better wettability. Further, it is compared with the film formed from a hydrophilic or water dispersible polyaniline without heating treatment, the toughness and durability of the film can be effectively improved.

When the brazed member of Example 5 is used as a heat exchanger for a vehicle air conditioner as in Example 1, scattering of water droplets can be suppressed compared with the use of a heat exchanger (Comparison Example) without performing hydrophilizing treatment.

A temperature controller equipped with the heat exchanger of Example 5 is capable of cleaning, degrading, deodorizing and sterilizing organic substances causative of contamination, odor and harmful microorganisms of the surrounding circumstances without scattering water generated upon operation, while carrying out smooth temperature control. Therefore, the same advantage described in Example 1 can be obtained.

Next, the relationship between the contact angle and the scattering amount of water in each of the polyaniline films prepared in Examples 1 to 5 will be described.

Figure 8:
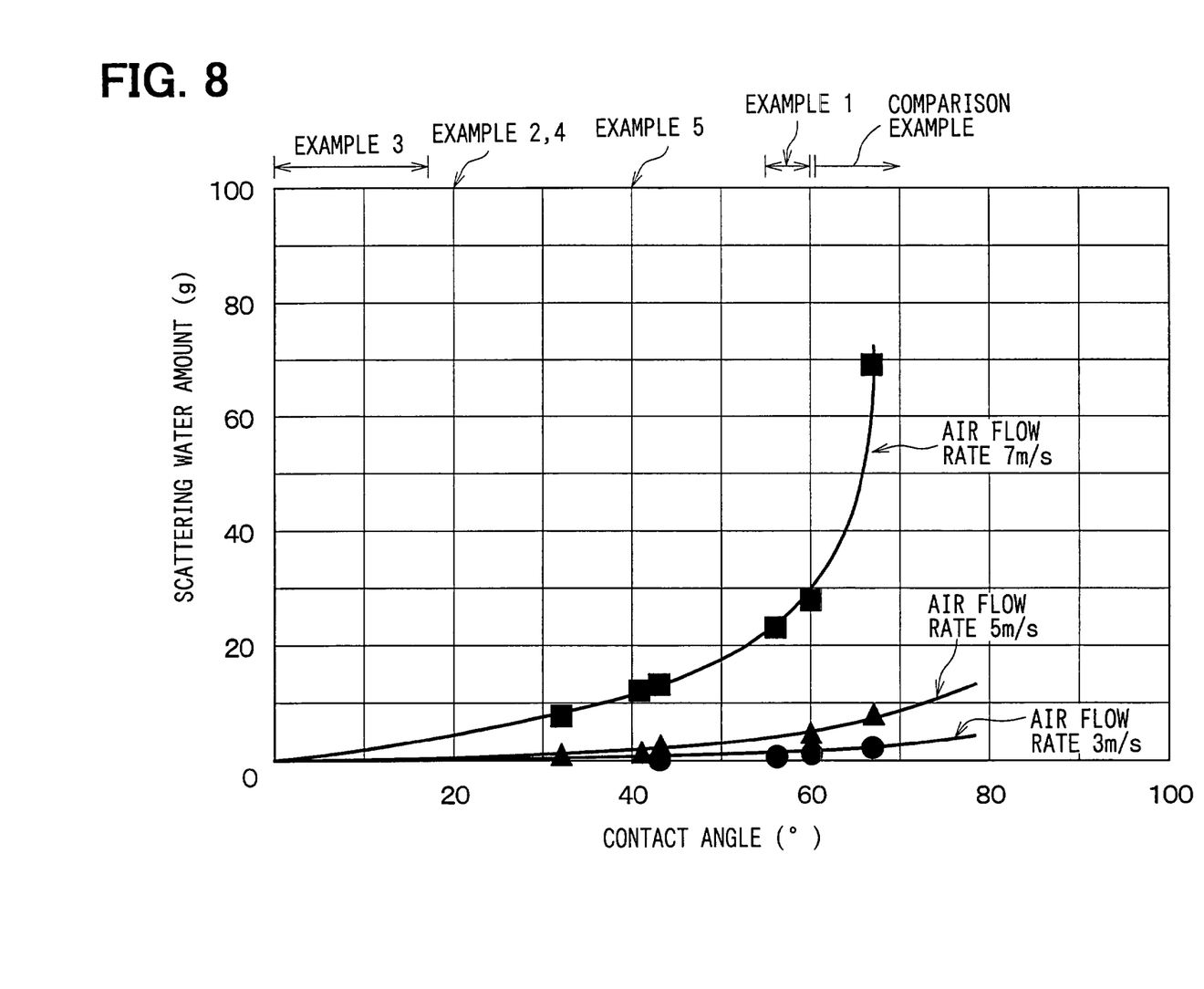
FIG. 8 is a graph showing the relationship between the contact angle of the film surface and a water scattering amount in Examples 1 to 5 of the present invention.

FIG. 8 illustrates the relationship between the contact angle (contact angle of fin) of the polyaniline film formed on the heat conducting surface of the heat exchanger 10 in Example 1 to 5 and a water amount scattering when air is blown to this heat exchanger 10. The flow rate of air blown to the heat exchanger 10 is changed at 3 m/s, 5 m/s and 7 m/s.

In FIG. 8, the black circle points mean the air flow rate of 3 m/s, the black triangle points mean the air flow rate of 5 m/s, and the black square points mean the air flow rate of 7 m/s. In this diagram, the polyaniline film (Comparison Example) without the hydrophilizing treatment has a fin contact angle exceeding 60°. The ranges and values of the fin contact angle corresponding to Examples 1 to 5 are shown in FIG. 8 within a range not greater than 60°.

As shown in FIG. 8, the scattering of water droplets can be suppressed greatly by adjusting the contact angle of the polyaniline film of each Example to 60° or less. Accordingly, a heat exchanger having the polyaniline film has good water wettability while maintaining deodorizing/sterilizing function. The contact angle is preferred when it does not exceed 40°.

Example 6

The above-described third film forming process (hydrophilization after formation of the polyaniline film) is applied to Example 6. Moreover, in Example 6, an interlevel film is interposed between the surface of a base material and the polyaniline film in order to improve the adhesion of the polyaniline film.

In Example 6, an aluminum-containing metal conventionally used as a fin material for the heat exchanger 10 is used as a base material. This fin material has a square piece of 30 mm×70 mm in size. The surface of the fin material is cleaned with an alkali solution as in Example 1. The alkali solution is then is washed off with running water.

Titanium phosphate treatment is then conducted for the formation of an interlevel film. The fin material washed with water is then immersed in a 0.3% aqueous solution of nitric acid for 30 seconds. After washing off the acid by water, chemical conversion treatment is performed to form a titanium phosphate film as the interlevel film.

A polyaniline film is then formed on the surface of the fin material having the titanium phosphate film formed thereon. As in Example 1, NMP is used as a solvent for film formation and polyaniline is dissolved at room temperature in this solvent as much as possible. In this Example, 2 wt. % of polyaniline is dissolved.

The above-described fin material is immersed in this solution, is drained, and then is dried. Drying is conducted at 140° C. for 15 minutes, so that the material is dried sufficiently. As in Example 1, pin holes of the polyaniline film are observed. The polyaniline film without the pin holes is hydrophilized with a 10% aqueous solution of nitric acid, and is followed by washing with water and drying.

In the fin material obtained in Example 6, polyaniline is doped type as in Example 1. Accordingly, the contact angle can be decreased, and the water wettability can be improved.

In a similar manner to Example 6 by using a similar fin material to that employed in Example 6 but omitting the above-descried titanium phosphate treatment, a fin material having a polyaniline film is prepared. The resulting fin material will hereinafter be called "bare aluminum material", while the fin material of Example 6 will be called "bare aluminum/titanium phosphate".

Figure 9A:
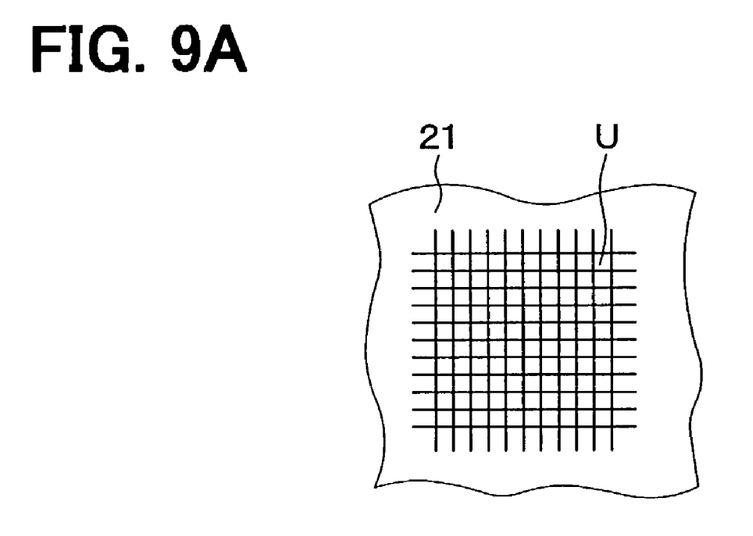
FIGS. 9A and 9B are a front view and a perspective view, for explaining an evaluation method of adhesion of the polyaniline film in Example 6 of the present invention.
Figure 9B:
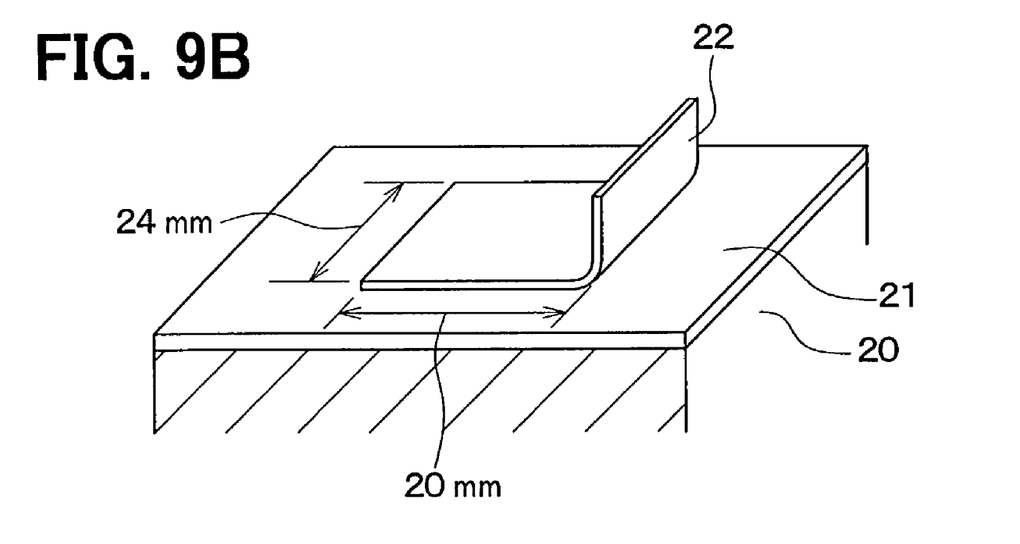

Adhesion of the polyaniline film with "bare aluminum material" or "bare aluminum/titanium phosphate" is evaluated. The evaluation method is shown in FIGS. 9A and 9B. As illustrated in FIG. 9A, parallel lines with a distance of 1 mm are drawn crosswise on the polyaniline film so as to expose the underlying polyaniline film by a cutter knife, whereby a grid is formed. This grid is partitioned by 11 parallel lines, both in length and width, meaning that the polyaniline film is divided into 100 pieces (unit U) having a size of 1 mm×1 mm.

As illustrated in FIG. 9B, an adhesive tape 22 is adhered closely onto the surface of the polyaniline film 21 over the fin material 20 so as to cover this grid portion. The size of region of the adhesive tape 22 adhered to the polyaniline film 21 is for example, about 20 mm×24 mm as shown in FIG. 9B.

Next, this adhesive tape 22 is peeled at once. In this case, the number of unit U of the polyaniline film 21 peeled together with the tape 22 are counted. As the number of unit U becomes larger, the adhesion of the polyaniline film becomes worse. Conversely, as the number of unit U becomes smaller, the adhesion of the polyaniline film becomes better.

Figure 10:
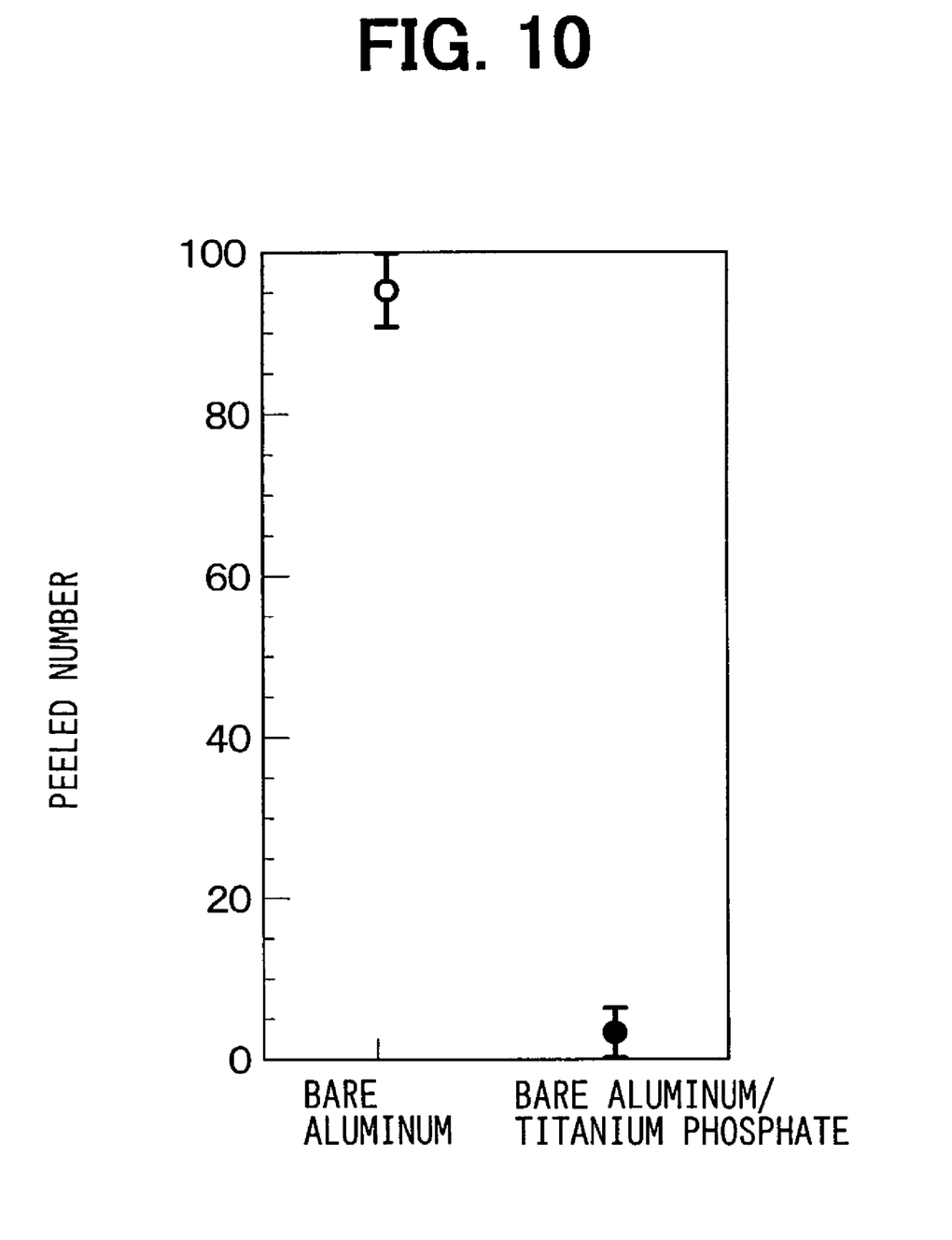
FIG. 10 is a graph showing the evaluation results of the adhesion by the evaluation method shown in FIGS. 9A and 9B.

FIG. 10 illustrates the evaluation results of the adhesion of the polyaniline film to each of "bare aluminum material" and "bare aluminum/titanium phosphate". The number of "n" is 4. As shown in FIG. 10, the fin material having an interlevel film interposed between the polyaniline film and the surface of the base material is much improved in the adhesion of the polyaniline film compared with the fin material without having the interlevel film.

It is possible to form a physically tough and not-easily-peelable polyaniline film by interposing, between the polyaniline film and the base material, an interlevel film formed by chemical conversion treatment with titanium phosphate.

Example 7

The above-described first film forming process is applied to Example 7. In Example 7, when a polyaniline film having a hydrophilic functional group is formed, an insolubilizing agent is added to insolubilize the film, so that the polyaniline film has good wettability and becomes tougher.

In Example 7, an aluminum-containing metal fin material conventionally used for the heat exchanger 10 is used as a base material. This fin material had a square shape of 10 mm×10 mm in size.

As in Example 1, the surface of the fin material is cleaned with an alkali solution, and is followed by washing with running water. As in Example 6, the fin material is subjected to titanium phosphate treatment, so that a titanium phosphate film as an interlevel film is formed on the surface of the fin material.

On the surface of the fin material having a titanium phosphate film formed thereon, a polyaniline film is formed. Polyaniline having a sulfonic acid group as a hydrophilic functional group is employed. This polyaniline itself is water soluble.

In water, 5 wt. % of this polyaniline having a sulfonic acid group is dissolved. In the resulting solution of polyaniline, a solution obtained by dissolving 40% of a carbodiimide-containing insolubilizing agent in water is incorporated at a volumetric ratio of 1:1.

The fin material after the titanium phosphate treatment is immersed in the mixed solution, is drained, and is then dried. Drying (heat treatment) is conducted at each of 60° C., 100° C., 140° C. and 200° C. Drying (heat treatment) is conducted at each temperature for different time period of 30 minutes and 120 minutes.

After immersion of the fin material having a polyaniline film formed under the above-described drying conditions in water for 72 hours, water solubility of the polyaniline film is evaluated. Evaluation is conducted by visual confirmation of the polyaniline film after immersion for 72 hours and measurement of absorbance of the water in which the material is immersed for 72 hours.

Figure 11A:
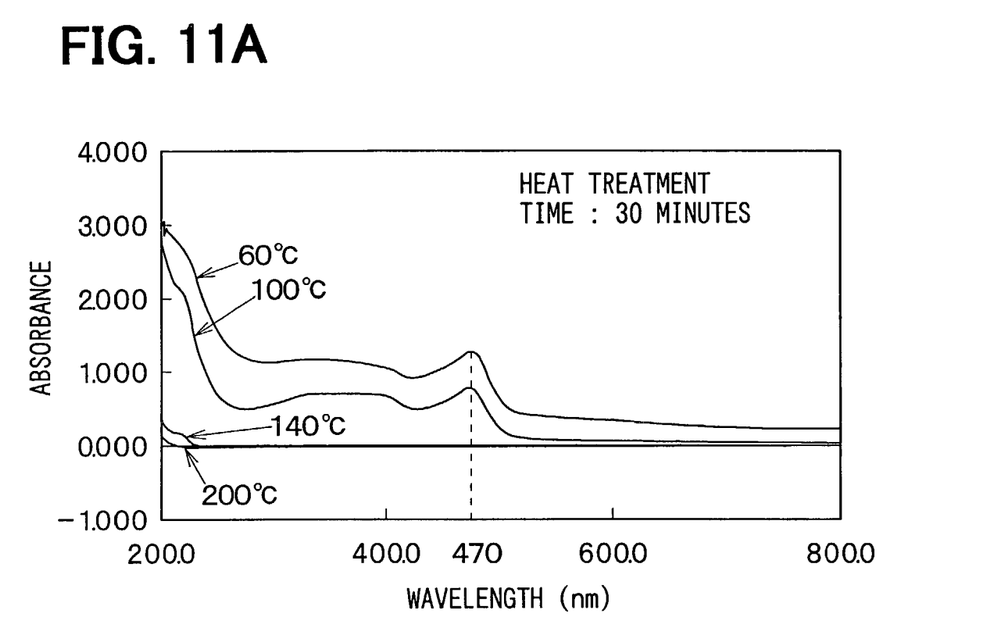
FIG. 11A is an absorbance spectrum graph showing the absorbance of a polyaniline film in Example 7 of the present invention after performing heat treatment for 30 minutes.
Figure 11B:
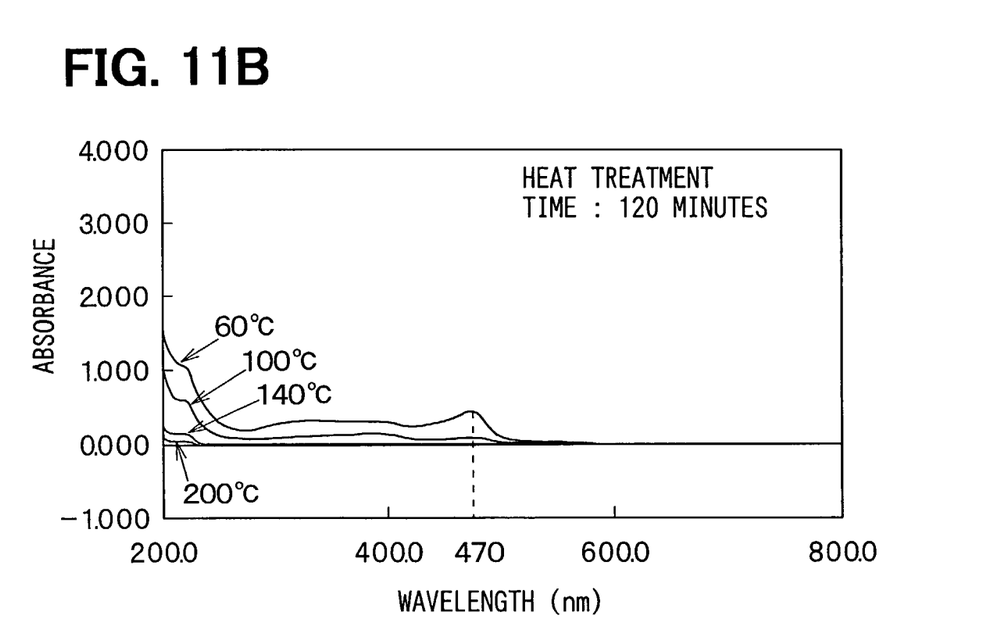
FIG. 11B is an absorbance spectrum graph showing the absorbance of the polyaniline film in Example 7 of the present invention after performing heat treatment for 120 minutes.

According to measurement of absorbance, a peak is found at around 470 nm when the polyaniline film added with the sulfonic acid group is dissolved in water. The measurement results of absorbance are shown in FIGS. 11A and 11B. FIG. 11A shows an absorbance spectrum at each drying temperature when the drying time, that is heat treatment time is 30 minutes or 120 minutes.

As shown in FIGS. 11A and 11B, the above-described peak at about 470 nm is not found at the drying temperature of 140° C. or greater. Therefore, it can determine that the polyaniline film is not dissolved in water. No dissolution in water is also confirmed by visual observation.

Thus, in Example 7, the polyaniline film having the hydrophilic functional group is mixed with a carbodiimide-containing insolubilizing agent for insolubilizing the film, so that a polyaniline film having good wettability and improved toughness can be obtained. As described above, the molecular weight of polyaniline increases by the crosslinking of polyaniline caused by the addition of an insolubilizing agent, and the resulting high molecular polyaniline cannot be eluted easily.

Among the fin materials having a polyaniline film formed under the above-described drying conditions, a film formed under the conditions of 140° C. for 30 minutes and a film formed under the conditions of 200° C. for 30 minutes are measured for each active oxygen generating capacity. In this measurement, water in which the fin material is immersed is taken out at intervals of 1 hour, 3 hours and 5 hours and a generation amount of hydrogen peroxide ($H_2O_2$) in water is measured by ESR, as shown in FIG. 12.

If active oxygen is generated in the reaction between water and polyaniline, hydrogen peroxide is detected by this ESR measurement. This means that the greater the generation amount of hydrogen peroxide, the higher the active oxygen generating capacity.

Figure 12:
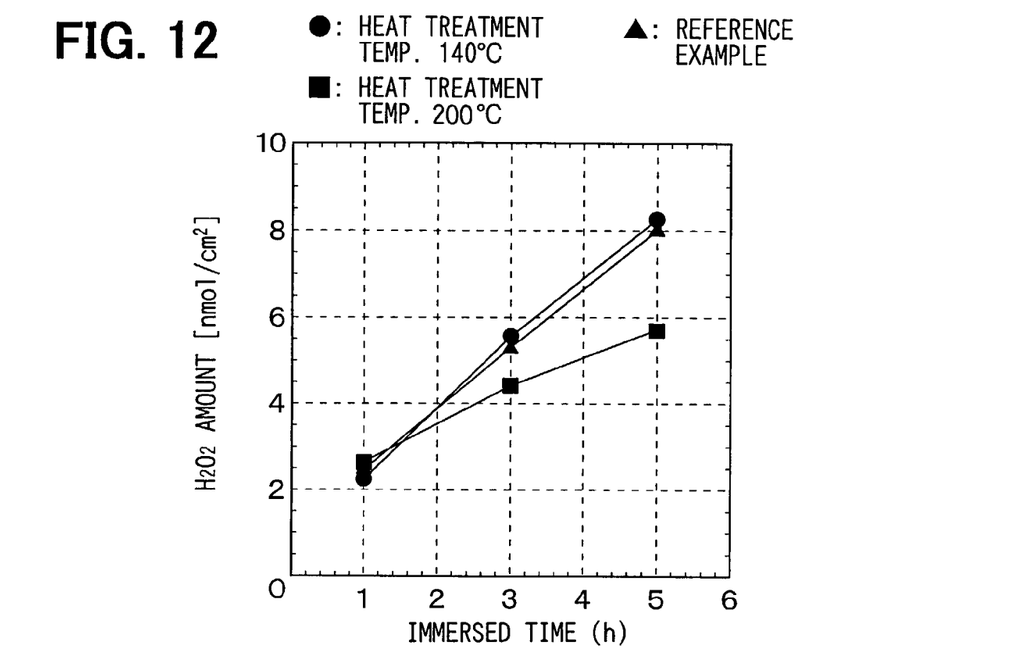
FIG. 12 is a graph showing the measurement results of active oxygen generating capacity in Example 7 of the present invention.

FIG. 12 illustrates the measurement results of this active oxygen generating capacity. In FIG. 12, as a reference example, the active oxygen generating capacity of a polyaniline film, formed by applying a solution of ordinarily employed polyaniline in NMP to a fin material, is measured. Even in the hydrophilic polyaniline film of Example 7 containing an insolubilizing agent, generation of hydrogen peroxide can be confirmed. Accordingly, the film of Example 7 has sufficient active oxygen generating capacity.

Among the fin materials having a polyaniline film formed under the above-described drying conditions, polyaniline films formed at drying temperatures, that is, at heat treating temperatures of 140° C. and 200° C., respectively, are measured for a change in the contact angle relative to the drying time, that is, the heat treating time, similarly to that in Example 1.

As Comparison Example, polyaniline without a hydrophilic functional group such as sulfonic acid group is dissolved in NMP and at heat treatment temperature of 140° C., the resulting solution is applied to the surface of a fin material subjected to the above-described titanium phosphate treatment. The formed film is measured for its contact angle in a similar manner.

Figure 13:
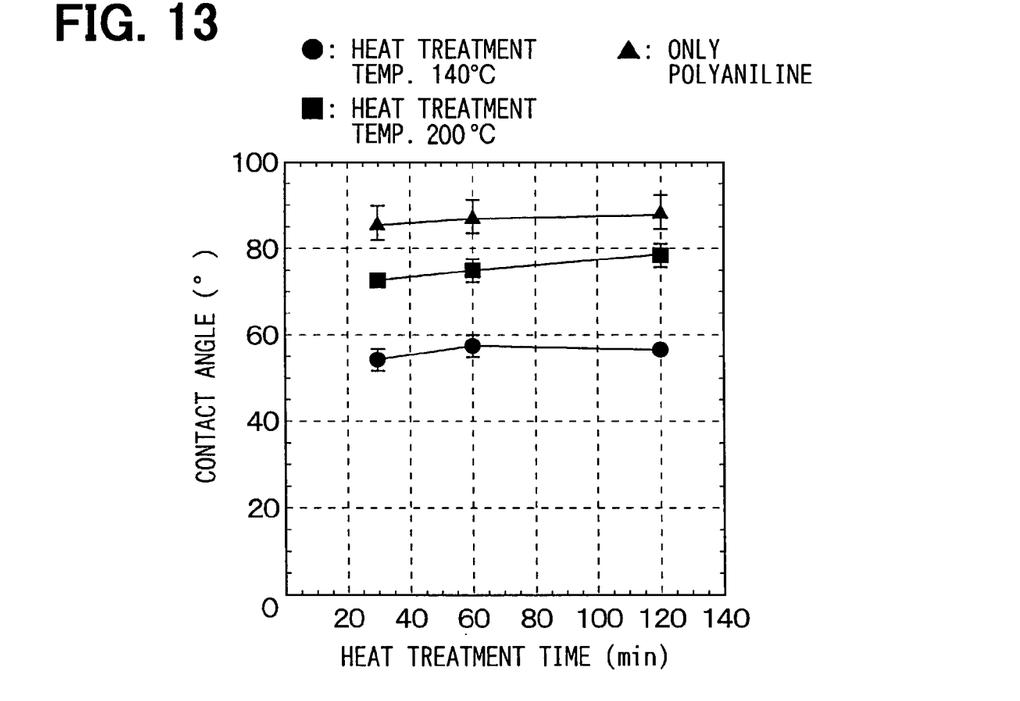
FIG. 13 is a graph showing the measurement results of the contact angle in Example 7 of the present invention.

FIG. 13 illustrates the measurement results of this contact angle. FIG. 13 shows contact angles of the polyaniline films of Example 7 at each drying temperature and Comparison Example, after being heat treated for 30, 60 and 120 minutes, respectively.

As shown in FIG. 13, the contact angle of Comparison example without hydrophilic functional group is over 80°. However, the contact angle of the polyaniline film having a sulfonic acid group and being insolubilized at each drying temperature is relatively low. Accordingly, the polyaniline film having a sulfonic acid group and being insolubilized is hydrophilized, and has improved wettability.

In the carbodiimide-containing compound in the insolubilizing agent, when at least one hydrophilic functional group, selected from the class consisting of a primary amino group, a secondary amino group, a tertiary amino group, an ammonium group, a nitric acid group, a carboxyl group, a sulfonic acid group, a phosphonic acid group and a hydroxyl group, is introduced to R1 or R2 in the above-described formula 3, the contact angle can be further reduced.

Although the present invention has been fully described in connection with the plural Examples with reference to the accompanying drawings, it is to be noted that various changes and modifications will become apparent to those skilled in the art.

For example, the base material member of the present invention can be used for other functional members except for the heat exchanger.

Such changes and modifications are to be understood as being within the scope of the present invention as defined by the appended claims

What is claimed is:

1. A base material element comprising:
   a base material member; and
   a polyaniline film on a surface of the base material member, wherein:
   the polyaniline film is made of polyaniline and/or a derivative thereof;
   the polyaniline film is imparted with at least one hydrophilic functional group selected from the group consisting of a primary amino group, a secondary amino group, a tertiary amino group, an ammonium group, a nitric acid group, a carboxyl group, a sulfonic acid group, a phosphonic acid group and a hydroxyl group;
   the base material member has a temperature lower than atmospheric temperature so that moisture in atmospheric air that contacts the base material member is operably condensed to water on the polyaniline film;
   the base material member is capable of cooling the atmospheric temperature;
   the polyaniline film is disposed outside of the base material member so that the polyaniline film directly contacts the atmospheric air and the water;
   the hydrophilic functional group in the polyaniline film is imparted on a surface of the polyaniline film for expanding the water to be a water film on the polyaniline film;
   the polyaniline film facilitates a generation of active oxygen having deodorization and sterilization functions by the condensed water;
   wherein the polyaniline film has been heat treated at 140–300° C. for 15–60 minutes.

2. The base material element according to claim 1, wherein the polyaniline film has a binder that is imparted with at least one hydrophilic functional group selected from a primary amino group, a secondary amino group, a tertiary amino group, an ammonium group, a nitric acid group, a carboxyl group, a sulfonic acid group, a phosphonic acid group and a hydroxyl group.

3. The base material element according to claim 1, wherein the polyaniline film has an insolubilizing agent for insolubilizing the polyaniline film.

4. The base material element according to claim 3, wherein the insolubilizing agent contains a carbodiimide group.

5. The base material element according to claim 1, wherein the polyaniline film has a contact angle with a water droplet of the water on a film surface thereof, the contact angle which is equal to or less than 60°.

6. The base material element according to claim 5, wherein the polyaniline film has a contact angle equal to or less than 40°.

7. The base material element according to claim 1, wherein the base material member is made of an aluminum-containing metal.

8. The base material element according to claim 1, wherein the polyaniline and/or derivative thereof has a dopant.

9. The base material element according to claim 1, further comprising
   an interlevel film between the surface of the base material member and the polyaniline film.

10. The base material element according to claim 9, wherein the interlevel film is formed by subjecting the surface of the base material member to at least one treatment selected from zinc phosphate treatment, titanium phosphate treatment, chromate treatment, molybdic acid treatment, selenium chloride treatment and silane compound treatment.

11. The base material element according to claim 1, wherein
   the polyaniline film contains a binder imparted with at least one hydrophilic functional group selected from the group consisting of a primary amino group, a secondary amino group, a tertiary amino group, an ammonium group, a nitric acid group, a carboxyl group, a sulfonic acid group, a phosphonic acid group and a hydroxyl group;
   the base material member has a temperature lower than atmospheric temperature around the base material member so that moisture in atmospheric air becomes condensed water on the polyaniline film;
   the base material member is capable of cooling the atmospheric temperature of the atmospheric air contacting a human being;
   the polyaniline film is disposed outside of the base material member so that the polyaniline film is exposed to the atmospheric air and the condensed water.

12. The base material element according to claim 1, wherein the base material element provides a heat exchanger.

13. The base material element according to claim 12, wherein the heat exchanger cools the atmospheric temperature of the air contacting with human being.

14. The base material element according to claim 1, wherein the polyaniline in the polyaniline film reduces oxygen in the condensed water into superoxide anion radical so that the generation of the active oxygen is facilitated.

15. The base material element according to claim 1, further comprising:
   an interlevel film disposed between the heat exchanger and the polyaniline film, wherein
   the interlevel film is made of chromate, molybdate, selenium chloride, or silane compound.

16. A method for performing at least one of deodorization and sterilization functions, the method comprising the steps of:
   preparing a member having a polyaniline film on an external surface on which atmospheric air flows, the polyaniline film being made of polyaniline and/or a derivative thereof, wherein the polyaniline film is imparted with at least one hydrophilic functional group selected from the group consisting of a primary amino group, a secondary amino group, a tertiary amino group, an ammonium group, a nitric acid group, a carboxyl group, a sulfonic acid group, a phosphonic acid group and a hydroxyl group;
   cooling the member below a temperature of the atmospheric air flowing on the external surface of the member;
   supplying the atmospheric air to the member;
   supplying water on the polyaniline film by condensing moisture in the atmospheric air supplied to the member cooled;
   imparting the hydrophilic functional group in the polyaniline film on a surface of the polyaniline film for expanding the water to be a water film on the polyaniline film;
   generating active oxygen in the condensed water by the polyaniline film;

performing at least one of deodorization and sterilization of the condensed water by the active oxygen generated by the polyaniline film; and then, supplying air to a room through the external surface of the member, wherein the polyaniline film is disposed outside of the member so that the polyaniline film directly contacts the atmospheric air, wherein the polyaniline film has been heat treated at 140–300° C. for 15–60 minutes.

17. The method according to claim 16, wherein the step of cooling, the step of supplying atmospheric air to the member, the step of supplying water, the step of generating, the step of performing, and the step of supplying air to the room are simultaneously carried out.

18. The method according to claim 17, wherein the step of generating and the step of performing are carried out as long as the condensed water remains on the polyaniline film.

19. The method according to claim 17, wherein the member is a heat exchanger for cooling air flowing therethrough.

20. The method according to claim 16, further comprising:

forming an interlevel film disposed between the member and the polyaniline film, wherein the interlevel film is made of chromate, molybdate, selenium chloride, or silane compound.

* * * * *